United States Patent
Waters et al.

(10) Patent No.: US 8,233,556 B2
(45) Date of Patent: Jul. 31, 2012

(54) REDUCED FEEDBACK TRANSMIT BEAMFORMING

(75) Inventors: Deric W. Waters, Dallas, TX (US); Tarkesh Pande, Dallas, TX (US); Anuj Batra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 838 days.

(21) Appl. No.: 11/776,215

(22) Filed: Jul. 11, 2007

(65) Prior Publication Data

US 2008/0019457 A1    Jan. 24, 2008

Related U.S. Application Data

(60) Provisional application No. 60/807,728, filed on Jul. 19, 2006.

(51) Int. Cl.
 *H04K 1/10* (2006.01)

(52) U.S. Cl. ......... 375/267; 375/347; 375/316; 375/231

(58) Field of Classification Search ................. 375/267, 375/347, 316, 231; 455/562.1, 63, 132, 137; 370/310, 203
See application file for complete search history.

(56) References Cited

U.S. PATENT DOCUMENTS

| | | | | |
|---|---|---|---|---|
| 6,141,393 A * | 10/2000 | Thomas et al. | ................ | 375/347 |
| 6,480,139 B1 * | 11/2002 | Hoctor | ................ | 342/13 |
| 7,068,981 B2 * | 6/2006 | Sim | ................ | 455/101 |
| 2004/0085890 A1 * | 5/2004 | Love et al. | ................ | 370/203 |
| 2006/0105767 A1 * | 5/2006 | Kim | ................ | 455/434 |
| 2006/0114816 A1 * | 6/2006 | Maltsev et al. | ................ | 370/210 |
| 2006/0239374 A1 * | 10/2006 | Aldana et al. | ................ | 375/267 |
| 2007/0015543 A1 * | 1/2007 | Ojard | ................ | 455/562.1 |
| 2007/0115799 A1 * | 5/2007 | Ting et al. | ................ | 370/208 |
| 2007/0195811 A1 * | 8/2007 | Basson et al. | ................ | 370/441 |
| 2007/0206626 A1 * | 9/2007 | Lee et al. | ................ | 370/437 |
| 2007/0226287 A1 * | 9/2007 | Lin et al. | ................ | 708/490 |
| 2007/0268181 A1 * | 11/2007 | Howard et al. | ................ | 342/368 |
| 2007/0297529 A1 * | 12/2007 | Zhou et al. | ................ | 375/267 |
| 2008/0075022 A1 * | 3/2008 | Lei et al. | ................ | 370/310 |
| 2011/0222620 A1 * | 9/2011 | Hansen et al. | ................ | 375/267 |

OTHER PUBLICATIONS

Davis, L.M.(Scaled and Decoupled Cholesky and QR decompositions with Application to Spherical MIMO detection, Wireless Communications and Networking, 2003. WCNC 2003, 2003 IEEE vol. 1, pp. 326-331).*

Scaglione, Anna et al., "Optimal Designs for Space-Time Linear Precoders and Decoders," IEEE Transactions on Signal Processing, vol. 50, No. 5, May 2002, pp. 1051-1064.

Telatar, Emre, "Capacity of Multi-Antenna Gaussian Channels," Technical Memorandum, Bell Laboratories, Lucent Technologies, Oct. 1995. Published in European Transactions on Telecommunications, vol. 10, No. 6, , Nov./Dec. 1999, pp. 585-595.

* cited by examiner

*Primary Examiner* — Shuwang Liu
*Assistant Examiner* — Helene Tayong
(74) *Attorney, Agent, or Firm* — Steven A. Shaw; W. James Brady; Frederick J. Telecky, Jr.

(57) ABSTRACT

A method and system for reduced feedback transmit beamforming computes a matrix of channel transfer function coefficients. The matrix of channel transfer function coefficients is compressed by applying a rotation matrix having orthogonal columns to the matrix of channel transfer function coefficients to produce a compressed transfer function matrix having a reduced number of non-zero coefficients. The compressed matrix is fed back to a transmitting unit. Decompression of the transfer function coefficient matrix is not required. This compression does not cause any performance degradation for transmit beamforming. The transmitting unit computes a set of beamsteering coefficients from the compressed matrix and applies the coefficients to signals prior to transmission. The beamformed signals are transmitted to the receiving unit and post-coded to allow the receiving unit to see an effective diagonalized channel.

23 Claims, 3 Drawing Sheets

REDUCED FEEDBACK TRANSMIT BEAMFORMING

CROSS-REFERENCE TO RELATED APPLICATIONS

The present application claims priority to U.S. provisional patent application Ser. No. 60/807,728, filed Jul. 19, 2006, and entitled "Reduced Feedback Transmit Beamforming" hereby incorporated herein by reference.

BACKGROUND

As consumer demand for high data rate applications, such as streaming video, expands, technology providers are forced to adopt new technologies to provide the necessary bandwidth. Multiple Input Multiple Output ("MIMO") is an advanced radio system that employs multiple transmit antennas and multiple receive antennas to simultaneously transmit multiple parallel data streams. Relative to previous wireless technologies, MIMO enables substantial gains in both system capacity and transmission reliability without requiring an increase in frequency resources. MIMO systems exploit differences in the paths between transmit and receive antennas to increase data throughput and diversity.

MIMO systems can be used to improve transmission reliability by transmitting multiple signals which represent the same data over the variant wireless channels, thus increasing the chances that the data can be recovered successfully. Diversity gain available from MIMO systems is equal to the product of the number of transmit antennas and the number of receive antennas. Space-time codes have been proposed as a means of attaining diversity in MIMO systems in the absence of channel state information ("CSI"), i.e. the channel transfer function, at the transmitter.

Transmit beamforming, also known as closed loop beamforming, is an alternative technique for achieving spatial diversity in MIMO systems. When compared with space-time coding, transmit beamforming requires a less complex receiver and provides enhanced array gain. Transmit beamforming relies on the transmitter having knowledge of the channel's characteristics, channel state information, and in order to avoid assumptions regarding reciprocal up-link and down-link channels, CSI may be provided to the transmitter by the receiver via a feedback channel.

The IEEE 802.11n wireless networking standard specifies multiple techniques for performing transmit beamforming. The techniques differ as to whether the burden of beamforming complexity is placed at the transmitter or the receiver, and as to the quantity of information that must be fed back to the transmitter. Limited feedback resources may result in a compromise between supplying the quantity of information necessary to completely characterize the channel and supplying a lesser quantity of information that may result in a higher complexity receiver and/or negate some of the benefits of transmit beamforming. Thus, an improved technique is needed that strikes a better balance between feedback overhead and transmitter/receiver complexity.

SUMMARY

Accordingly, various techniques are herein disclosed for compressing channel state information fed back from a receiving unit to a transmitting unit. Decompression of the channel state information is not required for use at the transmitting unit. In accordance with at least some embodiments, a method includes computing a matrix of transfer function coefficients for a communication channel. The transfer function matrix is compressed by applying a rotation matrix having orthogonal columns to the matrix of transfer function coefficients to produce a compressed transfer function matrix having a reduced number of non-zero coefficients. The compressed transfer function matrix is transmitted to a signal transmitter.

In other embodiments, an apparatus includes a transmitting unit and a receiving unit. The receiving unit is communicatively coupled to the transmitting unit via a communications channel. The receiving unit includes a CSI computer that determines a transfer function matrix for the communications channel. The receiving unit further includes a transfer function matrix compressor coupled to the CSI computer. The transfer function matrix compressor compresses the transfer function matrix by applying a rotation matrix to the channel transfer function matrix to produce a compressed channel transfer function matrix having a reduced number of non-zero coefficients.

In yet other embodiments, apparatus includes means for determining a channel transfer function matrix, and means for compressing the channel transfer function matrix by applying a rotation matrix to the channel transfer function matrix to produce a compressed channel coefficient matrix.

In some further embodiments, apparatus includes a receiver, a CSI computer, and a transfer function matrix compressor. The receiver receives a signal transmitted through a communications channel. The CSI computer, which processes the received signal to determine a transfer function for the communications channel, is coupled to the receiver. The transfer function matrix compressor, which is coupled to the CSI computer, compresses the channel transfer function matrix by applying a rotation matrix to produce a compressed transfer function matrix having a reduced number of non-zero coefficients.

Notation and Nomenclature

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . . ". The term "couple" or "couples" is intended to mean either an indirect or direct connection. Thus, if a first component couples to a second component, that connection may be through a direct connection, or through an indirect connection via other components and connections. The term "system" refers to a collection of two or more hardware and/or software components, and may be used to refer to an electronic device or devices, or a subsystem thereof. Further, the term "software" includes any executable code capable of running on a processor, regardless of the media used to store the software. Thus, code stored in non-volatile memory, and sometimes referred to as "embedded firmware," is included within the definition of software.

BRIEF DESCRIPTION OF THE DRAWINGS

In the following detailed description, reference will be made to the accompanying drawings, in which.

Figure 1:
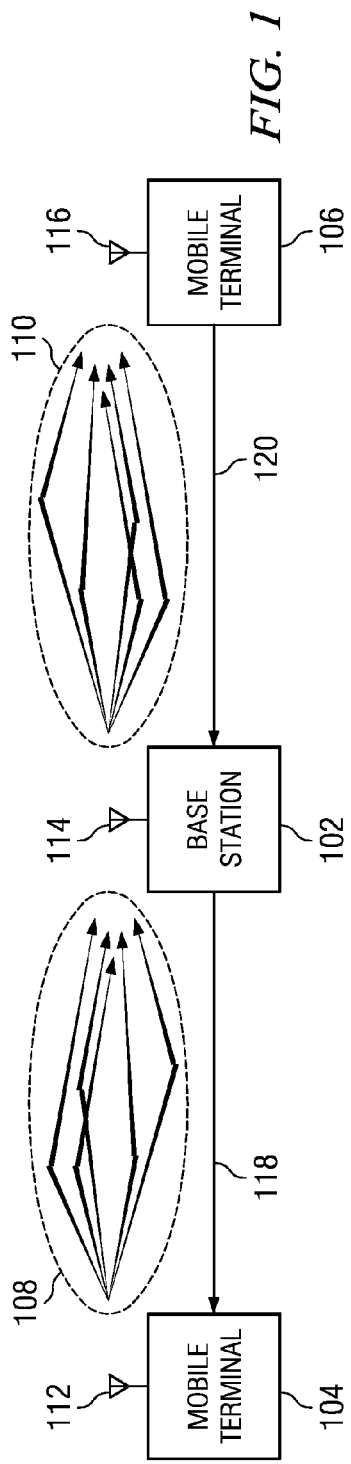
FIG. 1 shows an illustrative wireless network in accordance with embodiments of the invention.

The drawings show illustrative embodiments that will be described in detail. However, the description and accompanying drawings are not intended to limit the claimed invention to the illustrative embodiments, but to the contrary, the intention is to disclose and protect all modifications, equivalents, and alternatives falling within the spirit and scope of the appended claims.

DETAILED DESCRIPTION

Disclosed herein are various systems and methods for performing transmit beamforming with compressed channel state information that requires no decompression at the transmitter. The disclosed embodiments include an apparatus for transmit beamforming and a method for transmit beamforming that makes efficient use of the feed back channel and reduces processing overhead at the transmit beamformer.

Wireless systems employing orthogonal frequency division multiplexing ("OFDM") transmit information using multiple parallel tones or sub-carriers. A MIMO system employing OFDM applies transmit beamforming on a tone-by-tone basis. Thus, embodiments of the invention described in terms of a single OFDM sub-carrier are applicable to each of the plurality of sub-carriers employed by an OFDM system. Without loss of generality, the channel output for a given tone in the frequency domain may be modeled as:

$$r = Ha + w,$$

where H, the channel matrix, is an M×N matrix representing the channel transfer function, a is a N length vector of channel inputs, and w is additive noise. The input vector a may itself be a function of the symbols to be transmitted across the channel, a=Cs, where s is the T length vector of symbols to be transmitted, and the N×T matrix C maps the vector s into the channel input. Thus, the equation r=HCs+w describes the system during the calibration phase, prior to application of transmit beamforming.

The embodiments of the present disclosure are not limited to OFDM systems. The channel model also applies to other types of systems. For example, the equation r=HCs+w may also represent a memory-less time-domain channel with M outputs and N inputs. The single-input single-output intersymbol interference ("ISI") channel may also be modeled using the equation r=HCs+w. The same equation may also be used to model the channel over multiple OFDM symbols as is sometimes done to sound the channel using a different set of transmit antennas during different OFDM symbols.

To perform transmit beamforming, the transmitter uses knowledge of the channel to adapt its signal to create a diagonalized channel. One method of adapting the signal includes singular value decomposition ("SVD") of the channel matrix:

$$HC = U\Lambda V^*,$$

where U and V are unitary matrices, V* denotes the conjugate transpose of V, and $\Lambda$ is a diagonal matrix of the eigenvalues of HC. A transmitter with knowledge of the channel can transmit a=CVs, where s is the signal vector to be transmitted, which makes it possible for the receiver to see an effective diagonalized channel:

$$r = U\Lambda V^* V s + w$$
$$= U\Lambda s + w.$$

This equation describes the channel output when the transmitter applies beamforming with the matrix V. The receiver obtains an estimate of the channel, $\tilde{H}$, which is also an estimate of the matrix U$\Lambda$. To diagonalize the channel, the receiver multiplies the channel output by the forward-filter matrix F, which is a function of the receiver's channel estimate during beamforming, $\tilde{H}$. The purpose of applying the forward filter is to diagonalize the channel. There are multiple choices for the forward filter to achieve this purpose. The following is a non-exhaustive list of possible forward filters:

1. F=U*, the conjugate transpose of the matrix U or of an estimate of the matrix U.
2. F=$\tilde{H}$*, the conjugate transpose of the receiver's estimate of U$\Lambda$.
3. F=$\tilde{H}^{-1}$, the inverse of the receiver's estimate of U$\Lambda$.
4. F=($\tilde{H}$*$\tilde{H}$)$^{-1}\tilde{H}$*, the pseudoinverse of the receiver's estimate of U$\Lambda$. With an ideal channel estimate, $\tilde{H}$=U$\Lambda$, then ($\tilde{H}$*$\tilde{H}$)$^{-1}\tilde{H}$*=(U$\Lambda$)*.
5. F=($\tilde{H}$*$\tilde{H}$+$\sigma^2$I)$^{-1}\tilde{H}$*, the minimum mean-squared error linear filter. This option may be useful if the receiver's estimate of U$\Lambda$ is inaccurate.

When the forward filter is applied to the output of the channel the effective channel is either diagonal or near-diagonal:

$$y = Fr = FU\Lambda s + Fw.$$

For example, if F=(U$\Lambda$)* as in option 2 with accurate estimation, then the resulting channel is modeled as:

$$y = \Lambda\Lambda s + Fw.$$

Thus, the combination of precoding the signal vector s with the matrix V at the transmitter, and postcoding the received signal vector r with F at the receiver results in the effective diagonal channel, FU$\Lambda$, which is the transfer function between the signal vector s and the vector y. Because the channel is diagonal (i.e. orthogonal, independent and non-interfering with other channels), processing each symbol independently is optimal. This allows for relatively simple processing at the receiver to achieve good performance. In practice there are some circumstances for which the channel connecting s to y may not be completely diagonal. Under such circumstances further processing may be required at the receiver to recover the transmitted data. For example, the effective channel FU$\Lambda$ may be assumed to be a full matrix in which case any MIMO detector may be used to estimate the transmitted data. Reasons the effective channel may not be completely diagonal include, for example, channel changes since the last calibration, as well as quantization and estimation errors.

Transmit beamforming serves to reduce complexity at the receiver, however, that receiver simplification is obtained by sending the channel information, i.e. the channel matrix, from the receiver to the transmitter. To reduce the overhead of feeding back channel information from receiver to transmitter, the receiver may compress the channel matrix. One disadvantage of compression is the increased complexity required at both receiver and transmitter to compress and decompress the channel information. Another disadvantage is that compression techniques typically cause a loss of information. The embodiments of the present disclosure provide a compression technique that requires no decompression at the transmitter and causes no loss of information relative to the uncompressed channel matrix.

In at least some preferred embodiments of the invention, the receiver reduces the amount of channel matrix data transferred across the feedback channel by decomposing the channel matrix to produce a triangular matrix, and transferring the non-zero coefficients of the triangular matrix to the transmitter. Transferring a compressed matrix R instead of the uncompressed matrix HC back to the transmitter does not degrade beamformer performance. However, if HC contains 2MT real coefficients, then the compressed matrix R contains as few as $T^2$, and $2MT-M^2$ real coefficients when $M \geq T$ and $M<T$, respectively. For example, when M=T the compression reduces the amount of data fed back to the transmitter by 50%.

The receiver computes a triangular matrix and feeds the triangular matrix back to the transmitter. The triangular matrix is a compressed version of the channel response matrix, HC. Compression is accomplished by transforming HC into a matrix which retains the information useful to the transmitter, but which has fewer non-zero complex coefficients. The compression operation is defined as follows:

$$R=f(HC),$$

where the compressed matrix R, which may be a triangular matrix in some embodiments, contains fewer complex coefficients than the effective channel matrix HC, and the function $f(\bullet)$ represents the compression function. One exemplary method of producing a triangular coefficient matrix is by QR decomposition of the channel matrix HC:

$$HC=QR,$$

where Q is a unitary matrix, and R is an upper or lower triangular matrix with M rows, T columns, and real diagonal elements. The matrix R is upper triangular when the coefficient at the ith row and jth column is zero if $i>j$. For the case $M \geq T$, the matrix R is lower triangular when the coefficient at the ith row and jth column is zero if $i<j$ and the bottom M-T rows contain only zeros. For the case $M<T$, the matrix R is lower triangular when the coefficient at the ith row and jth column is zero if $i+T-M<j$. The diagonal elements of the upper triangular matrix R are those coefficients from the ith row and ith column. For the case when $M \geq T$, the diagonal elements of the lower triangular matrix R are those coefficients from the ith row and ith column. For the case when $M<T$, the diagonal elements of the lower triangular matrix R are those coefficients from the (i+T-M)th row and (i+T-M)th column. In an alternative definition, when $M>T$ the rows of R containing only zeros are neglected and R has only T rows and T columns, while Q has M rows and T columns.

Thus, the compression function $f(\bullet)$ may be defined by the QR decomposition. There are many specific QR decomposition implementations, any of which may be used to implement the compression function. Some QR decomposition implementations compute R without computing Q. Computing the matrix Q is not necessary for purposes of feeding back R, so another way to define R does not involve the matrix Q:

$$(HC)^*(HC)=R^*R,$$

where $(HC)^*$ and $R^*$ are the conjugate transposes of HC and R, respectively. The Cholesky decomposition is an example of a method for implementing the compression function $f(\bullet)$ based on the equation $(HC)^*(HC)=R^*R$.

The compression function may be defined more generally as applying a rotation matrix with orthogonal columns to the matrix HC. In the case of the QR decomposition, $R=Q^*HC=f(HC)$, where $Q^*$ is the conjugate transpose of Q. The matrix $Q^*$ is just one example of a rotation matrix with orthogonal columns which yields an R matrix with fewer complex coefficients than the matrix HC. Another implementation of the compression function could use one or more Givens rotations to compute a rotation matrix with orthogonal columns which yields a compressed matrix R with fewer real coefficients than the matrix HC.

While the matrix R, produced by the compression function $f(\bullet)$ may be triangular in some embodiments, the embodiments of the present disclosure are not limited to functions producing triangular matrices, but include application of rotation matrices producing R having fewer real coefficients than the uncompressed channel matrix. QR decomposition, Cholesky decomposition and equivalents are a subset of these rotations.

In addition to the application of rotation matrices, the compression function $f(\bullet)$ may further process and/or compress the matrix R. For example, the matrix R may be scaled by a constant such that one of its coefficients is one. If the transmitter and receiver agree beforehand about which coefficient will be normalized in this way, then the normalized coefficient need not be a part of the information fed back to the transmitter. The following is a non-limiting list of possible definitions for the compression function f(A), where A is the matrix to be compressed.

Definitions for R=f(A):

1. $R=Q^*HC$, where Q is a rotation matrix with orthogonal columns computed from A.

Special cases:

1a. R is computed from the QR decomposition of A.

1b. R is computed from the Cholesky decomposition of A.

1c. R is computed by applying one or more Givens or Householder rotations to the matrix A.

Note that explicit computation of Q is not always necessary to compute R in this manner.

2. $R=\alpha \tilde{R}$ a scaled version of $\tilde{R}$ where $A^*A=\tilde{R}^*\tilde{R}$ and where $\alpha$ is a scalar. Example definition of $\alpha$:

$\alpha=b/\tilde{R}_{j,j}$, then the jth diagonal of R is equal to the scalar b, if the transmitter and receiver agree beforehand on the values of b and j, then the jth diagonal of R need not be fed back to the transmitter.

3. $R=g(\tilde{R})$, where $A^*A=\tilde{R}^*\tilde{R}$ and $g(\tilde{R})$ is an arbitrary function of $\tilde{R}$. For example, the g function may permute the rows and columns in a specific order without changing the number of non-zero coefficients.

Knowledge of the placement of the coefficients fed back from the receiver to the transmitter into the matrix R must be shared between the transmitter and receiver, or established beforehand. Then when the receiver feeds the triangular matrix R back to the transmitter, the transmitter may perform beamforming as if the channel matrix is R rather than H. The additional rotation due to the matrix Q is not necessary to implement beamforming in accordance with embodiments of the invention. For example, the transmitter may compute the SVD of the matrix R:

$$R=U_r \Lambda_r V_r^*.$$

The transmitter may then adapt its signal according to $a=C_2 V_r s$ using the beam steering matrix $V_r$, which makes it possible for the receiver to see an effective channel that is diagonalized. For example, when $C_2=C$:

$$r = HCV_r s + w$$
$$= QRV_r s + w$$
$$= QU_r \Lambda_r V_r^* V_r s + w$$
$$= QU_r \Lambda_r s + w$$
$$= Q_r \Lambda_r s + w$$

Alternatively, the transmitter may remove the calibration matrix from the matrix R fed back from the receiver before computing the beam steering matrix. For example, the transmitter may compute its beam steering matrix from the SVD of the matrix $R(C^*C)^{-1}C^*$:

$$R(C^*C)^{-1}C^* = U_r \Lambda_r V_r^*.$$

Then the transmitter may adapt its signal according to $a = C_2 V_r s$ using the beam steering matrix $V_r$ computed from the SVD of $R(C^*C)^{-1}C^*$ or the SVD of a subset of the columns of $R(C^*C)^{-1}C^*$. One benefit of this approach is that matrix $C_2$ need not be the same as the matrix C used during the calibration stage. This option also allows the transmitter to use a subset of the antennas used during the calibration stage if desired.

To diagonalize the channel, the receiver may multiply the channel output by one of the forward filter matrices F listed above. One example of a forward filter is $F = (Q_r \Lambda_r)^*$, the conjugate transpose of the effective channel matrix $Q_r \Lambda_r$ during beamforming. With this choice of the forward filter (option 2 from the above list), the channel is diagonalized by multiplying the channel output by F:

$$y = Fr = \Lambda_r \Lambda_r s + Fw.$$

where $\Lambda_r \Lambda_r$ is a diagonal matrix since the matrix $\Lambda_r$ is diagonal.

Compressing channel information in accordance with the preferred embodiments of the present disclosure, has a number of advantages. For example, relative to feeding back a full channel matrix, the overhead required to feed back channel information in a triangular matrix is reduced; for example, when M=T=N the reduction is 50%. Additionally, contrary to a feedback scheme that reduces overhead by returning only a subset of the channel information, embodiments of the present disclosure return full channel state information, which has applications beyond beamforming. Further, the computational requirements of the transmitter are reduced because the transmitter computes the SVD of, for example, a triangular matrix rather than a full matrix to generate the beamforming coefficients, and no decompression is required at the transmitter.

FIG. 1 shows an illustrative wireless network. The network comprises a base station 102, and a pair of remote terminals 104, 106. While for the sake of convenience only base station 102 and remote terminals 104, 106 are illustrated, in practice, a wireless network may comprise one or more base stations and one or more remote terminals. Base station 102 may also be known as a Node B, a base transceiver system, an access point, etc. Remote terminals 104, 106 may also be referred to as the User Equipment ("UE"), and in general, may be a fixed or portable wireless device, a cellular phone, a personal digital assistant, a wireless modem card, or any other device configured to operate on a wireless network. Remote terminals 104, 106 and base station 102 each include at least one antenna 112, 114, 116 for transmitting and receiving radio frequency signals. To enable beamforming, the transmitting unit includes more than one antenna.

Remote terminal 104 transmits to base station 102 though up link channel 108. Up link channel 108 may contain reflectors that create multiple signal paths between mobile terminal 104 and base station 102. Down-link channel 118 is used to transfer information from base station 102 to remote terminal 104. When base station 102 provides channel state information to remote terminal 104 via the feed back channel, down-link channel 118, transmit beamforming may be applied to transmissions from remote terminal 104 to base station 102. The quantity of information required to characterize the channel 108 may be large when employing multiple sub-carriers. Advantageously, embodiments of the present disclosure allow less feedback to transfer the same quantity of channel state information without increasing system complexity. In accordance with embodiments of the present disclosure, base station 102 may feed back to remote terminal 104 a rotated channel matrix. The rotated channel matrix results from application of a rotation matrix with orthogonal columns to the full channel matrix, and the rotated channel matrix contains fewer non-zero coefficients than the full channel matrix. Feeding back the rotated matrix rather than the full channel matrix may substantially reduce loading of feedback channel 118 while providing full channel state information.

Base station 102 transmits to remote terminal 106 via down-link channel 110. Down-link channel 110 may contain obstacles that reflect transmissions from base station 102 creating multiple signal paths to remote terminal 106. In accordance with embodiments of the present disclosure, remote terminal 106 may provide a rotated matrix of channel state information, for example a triangular matrix, to base station 102 via up link channel 120, the feed back channel. Base station 102 may transmit beamformed signals to mobile terminal 106 via channel 110.

Thus, although transmit beamforming may ordinarily be applied on the wireless system uplink, the disclosed embodiments of the invention are not so limited, and are applicable to transmit beamforming applied on the up-link and/or down-link.

Figure 2:
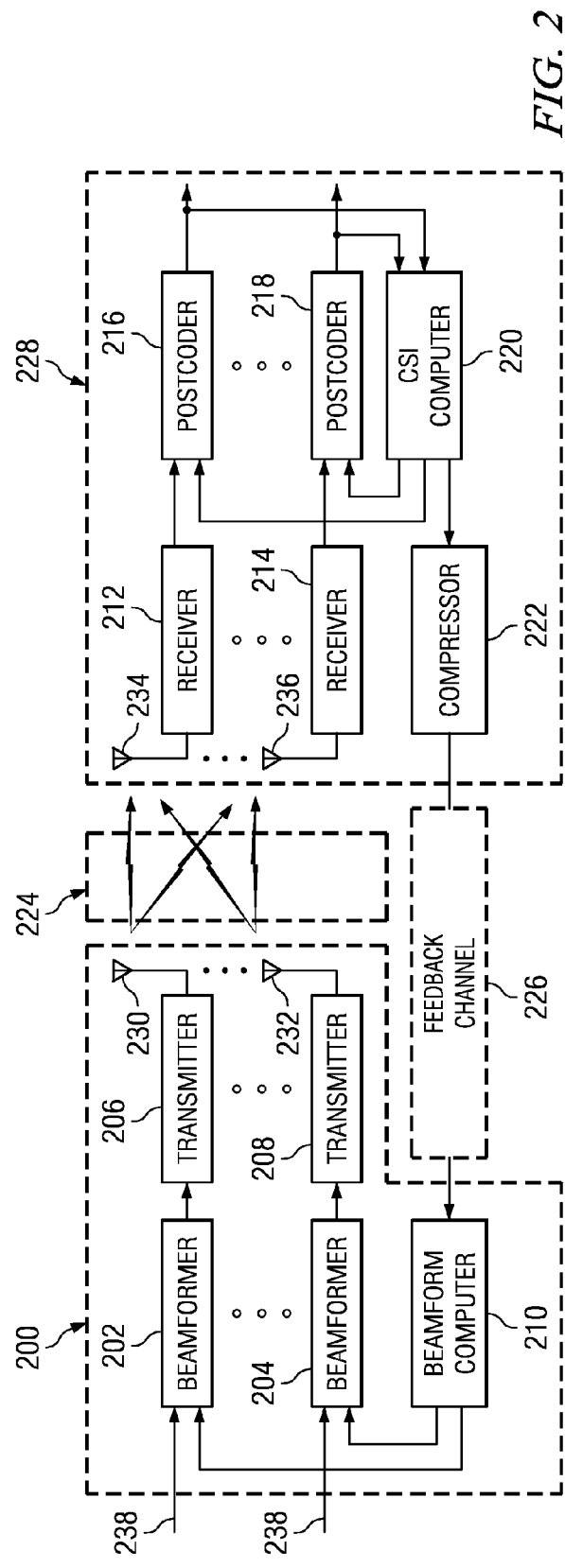
FIG. 2 shows a block diagram of an illustrative beamforming system in accordance with embodiments of the invention.

FIG. 2 shows an illustrative transmit beamforming system in accordance with embodiments of the present disclosure. Transmitting unit 200 transmits radio frequency signals through transmission channel 224. The radio frequency signals are received by receiving unit 228. Transmit beamforming requires that channel information be fed back from the receiving unit 228 to the transmitting unit 200; therefore, transmitting unit 200 initially transmits unbeamformed signals through channel 224 to receiving unit 228. The unbeamformed signals may comprise calibration or sounding signals from which receiving unit 228 estimates the characteristics of channel 224. Signals received from antennas 234, 236 are down converted to baseband and digitized in receivers 212, 214. Note that while two antennas 234, 236 are illustrated, receiving unit 228 may employ one or more antennas. Moreover, receivers 212, 214 may further process the digitized signals, e.g. preamble removal, FFT, etc. CSI computer 220 estimates the response of channel 224 from the digitized baseband signals. The CSI computer 220 may comprise any system of hardware and/or software components configured to produce channel state information. The channel state information produced by CSI computer 220 is compressed in compressor 222 and fed back to transmitting unit 200 through feed back channel 226. In accordance with embodiments of the invention, the compressor 222 may apply a rotation matrix to the channel matrix to reduce the number of non-zero matrix coefficients while maintaining channel state information. For example, QR decomposition or Cholesky decomposition may be applied to triangularize the channel information matrix. Additionally, compressor 222 may scale the compressed matrix to produce a preselected value at a matrix location known to both the receiving unit 228 and the transmitting unit 200. The scaled value at the known matrix location need not be transferred from the receiving unit 228 to the transmitting unit 200. The compressed matrix of channel information requires fewer channel resources to transfer than are required to transfer a full channel information matrix, in some cases reduction is more than 50%. Note that for simplicity, feedback channel 226 is depicted as connecting compressor 222 and beamform computer 210 when in practice the feed back channel resides between the antenna systems of the two units, and additional transmitter and receiver circuitry is associated with the feed back channel. CSI computer 220 and compressor 222 may be implemented using, for example, a digital signal processor and associated software, a general purpose processor, a fixed or programmable logic implementation, such as an ASIC or FPGA, or other circuitry.

Beamform computer 210 calculates beamforming coefficients from the channel information received via feed back channel 226. In accordance with the present disclosure, the beamform computer 210 may perform, for example, singular value decomposition of the received compressed channel information matrix to generate the beamforming coefficients. After computation of the beamforming coefficients, signals transmitted by transmitting unit 200 may be precoded, i.e. beamformed, to optimize transmission through channel 224.

Signals 238, comprising one or more symbols, to be beamformed are multiplied by the beamforming coefficients in beamformers 202, 204. The beamformed signals may be further processed, for example, in an OFDM system an inverse FFT may be applied, a cyclic prefix or zero-padded suffix attached, etc. before the signals are converted to analog and up converted to radio frequencies by transmitters 206, 208 and transmitted over the air via antennas 230, 232. Beamformers 202, 204 and beamform computer 210 may be implemented using, for example, a digital signal processor and associated software, a general purpose processor, a programmable or fixed logic implementation, such as an ASIC or FPGA, or other circuitry. Note that although two antennas and associated components are illustrated in transmitting unit 200, in practice transmitting unit 200 may employ more than two antennas.

Receiving unit 228 receives the beamformed signals transmitted by transmitting unit 200 via channel 224. The received beamformed signals comprise the beamformed signals transmitted by transmitters 206, 208 as altered by the channel 224 plus additive noise. Beamformed signals received from antennas 234, 236 are down converted to baseband and digitized in receivers 212, 214. The digitized baseband signals are post-coded, multiplied by a set of shaping coefficients, in postcoders 216, 218. In accordance with the present disclosure, postcoders 216, 218 may multiply the received beamformed signals by a forward-filter matrix F, a function of the receiver's estimate of the channel during beamforming, to diagonalize the channel 224.

Figure 3A:
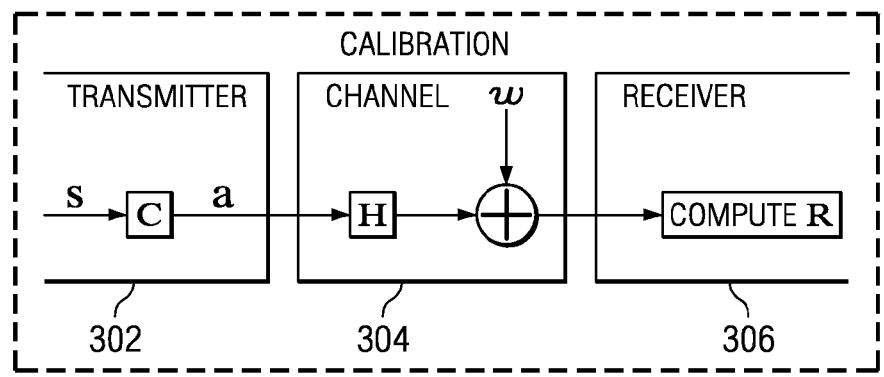
FIG. 3A shows an illustrative beamforming system in the calibration state in accordance with embodiments of the invention.

FIG. 3A shows a beamforming system in accordance with embodiments of the invention as calibration is performed. Transmitter 302 transmits unbeamformed signals as indicated by $a=Cs$. The transmitted signal is multiplied with the channel transfer function H and noise w is added as the signal passes through channel 304. The transmitted signals, modified by channel 304 are received by receiver 306. The effective channel matrix HC and the compressed (i.e. rotated) channel matrix R may be computed from the received signal. The compressed channel matrix R is fed back to transmitter 302 for use in beamforming.

Figure 3B:
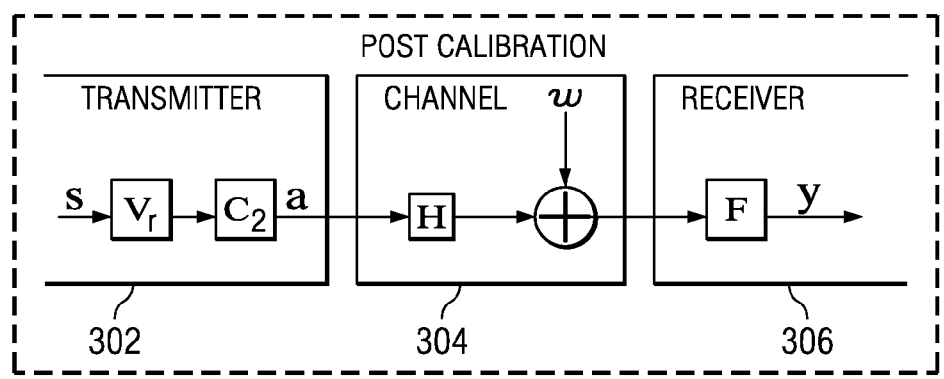
FIG. 3B shows an illustrative beamforming system in the post-calibration state in accordance with embodiments of the invention.

FIG. 3B shows a beamforming system in accordance with embodiments of the invention after calibration is complete. Transmitter 302 adapts its signal according to $a=C_2V_r s$, enabling the receiver to see an effective channel that is diagonalized. The transmitted beamformed signal is multiplied with the channel transfer function H and noise w is added as the beamformed signal passes through channel 304. The transmitted beamformed signals, modified by channel 304 are received by receiver 306. To diagonalize the channel, receiver 306 multiplies the channel output by the forward-filter matrix F, a function of the receiver's estimate of the channel during beamforming.

Figure 4:
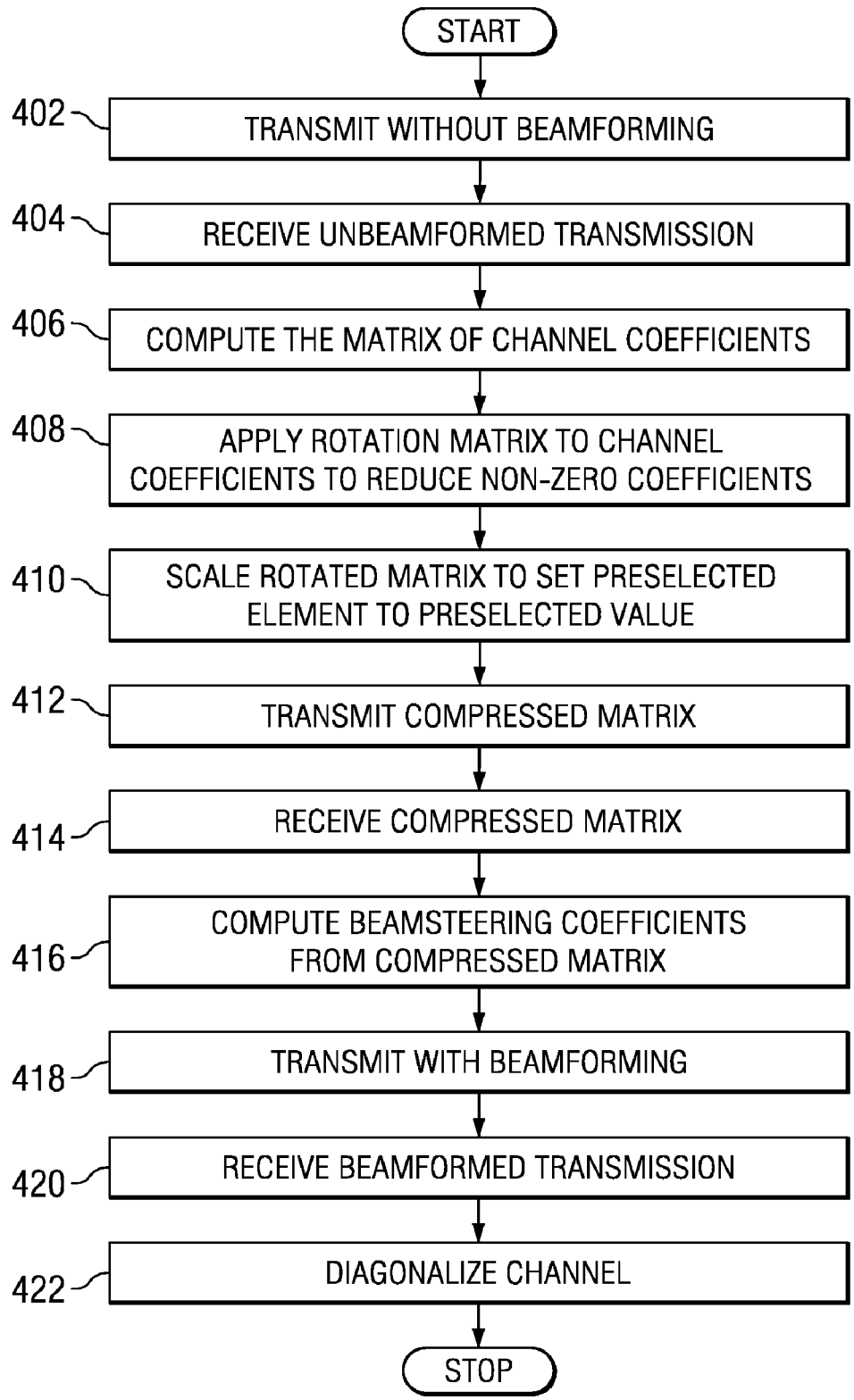
FIG. 4 shows a flow diagram for an illustrative beamforming method in accordance with embodiments of the invention.

FIG. 4 shows a flow diagram for a beamforming method in accordance with embodiments of the invention. Though depicted sequentially, as a matter of convenience, a variety of the actions shown can be performed in a different order and/or performed in parallel. In block 402, the transmitting unit 200 transmits unbeamformed radio frequency signals (e.g. calibration/sounding signals) through channel 224 to the receiving unit 228. The unbeamformed signals are received by the receiving unit 228 in block 404. The receiving unit 228 computes a matrix of channel coefficients, estimating the response of the channel 224, from the received unbeamformed signals in block 406. Feed back of the matrix of channel coefficients to the transmitting unit requires dedication of substantial feedback resources. Therefore, the beamforming method of the preferred embodiments compresses the channel coefficient matrix. In block 408, the channel coefficient matrix is compressed by applying a rotation matrix to the channel coefficient matrix that reduces the number of non-zero coefficients in the rotated matrix. For example, by triangularizing the channel coefficient matrix, the amount of data that must be transferred to fully describe the channel is reduced by more than 50% in some cases. Additionally, no decompression of the transferred data is required at the transmitting unit 200. The channel coefficient matrix may be triangularized by application of, for example, QR decomposition, Cholesky decomposition, or the equivalent.

In block 410, the compressed channel coefficient matrix may be further processed by scaling the matrix to produce a preselected value in a preselected matrix element. When the element and value are known to both transmitting and receiving units, the value need not be fed back to the transmitting unit.

In block 412 the receiving unit 228 transmits the compressed matrix of channel information to the transmitting unit 200 via the feed back channel 226. The transmitting unit 200 receives the compressed channel information matrix in block 414, and computes the beamsteering coefficients from the compressed matrix in block 416. The beamsteering coefficients may be determined by computing the SVD of the compressed channel information matrix.

In block 418, the transmitting unit 200 multiplies signals to be transmitted to the receiving unit by the beamsteering coefficients to beamform the signals. The beamformed signals may be further processed, converted to analog form, up converted to radio frequencies, and transmitted to the receiving unit 228 through channel 224.

The receiving unit 228 receives the beamformed signals, as altered by the communication channel and with additive noise, in block 420. The radio frequency signals are down converted to baseband and digitized. To diagonalize the channel, in block 422, the receiving unit 228 may multiply the received beamformed signals by the forward-filter matrix F, a function of the receiver's estimate of the channel during beamforming.

While illustrative embodiments of this invention have been shown and described, modifications thereof can be made by one skilled in the art without departing from the spirit or teaching of this invention. The embodiments described herein are illustrative and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A method for beamforming comprising:
computing a matrix of transfer function coefficients for a communication channel;
applying a rotation matrix having orthogonal columns to the matrix of transfer function coefficients to produce a compressed transfer function matrix (R) having a reduced number of non-zero coefficients and a set of statistical characteristics which are the same as a channel transfer function matrix (H) such that H*H=R*R;
scaling the compressed transfer function matrix (R) to produce a preselected value at a known location of the compressed transfer function matrix (R); and
transmitting non-zero coefficients of the compressed transfer function matrix values to a signal transmitter;
wherein the non-zero coefficients values are directly useable as the channel transfer function matrix to compute a beamsteering matrix at the signal transmitter.

2. The method of claim 1 further comprising:
computing a set of beamsteering coefficients from the compressed transfer function matrix;
applying the beamsteering coefficients to a signal prior to transmission to produce a beamformed signal;
transmitting the beamformed signal through the communications channel; and
postcoding a received beamformed signal to diagonalize the communications channel.

3. The method of claim 2, further comprising postcoding the received beamformed signal by multiplying the received beamformed signal by a channel diagonalizing matrix.

4. The method of claim 2, further comprising factoring the compressed transfer function matrix by singular value decomposition to produce the beamforming coefficients.

5. The method of claim 1, further comprising compressing the transfer function matrix by applying operations selected from the group consisting of QR decomposition and Givens rotations, wherein Q is a unitary matrix and R is an upper or lower triangular matrix.

6. The method of claim 1, further comprising scaling the compressed transfer function matrix to produce a scaled compressed transfer function matrix having a preselected coefficient set to a preselected value.

7. The method of claim 1, further comprising compressing the transfer function matrix by applying operations selected from the group consisting of Cholesky decomposition and Householder rotations, wherein the compressing produces one of an upper triangular matrix and lower triangular matrix.

8. The method of claim 1, further comprising scaling the compressed transfer function matrix to produce a scaled compressed transfer function matrix having a preselected diagonal set to a preselected value; and wherein the coefficients of the preselected diagonal are not transmitted to the signal transmitter.

9. A system comprising:
a transmitting unit;
a receiving unit communicatively coupled to the transmitting unit via a communications channel;
the receiving unit comprising:
a channel state information CSI computer; and
a transfer function matrix compressor coupled to the CSI computer, wherein the CSI computer determines a channel transfer function matrix for the communications channel, and the transfer function matrix compressor compresses the channel transfer function matrix by applying a rotation matrix to the channel transfer function matrix to produce a compressed channel transfer function matrix (R) having a reduced number of non-zero coefficients and a set of statistical characteristics which are the same as a channel transfer function matrix (H) such that H*H=R*R and scales the compressed transfer function matrix (R) to produce a preselected value at a known location of the compressed transfer function matrix (R),
wherein the compressed channel matrix values are directly useable as a channel transfer function matrix to compute a beamforming matrix at the transmitting unit.

10. The system of claim 9, wherein the receiving unit transfers only the non-zero coefficients of the compressed channel transfer function matrix to the transmitting unit.

11. The system of claim 9, wherein the transmitting unit comprises a beamform computer that computes a set of beamforming coefficients from the compressed channel transfer function matrix.

12. The system of claim 11 wherein the transmitter further comprises a beamformer coupled to the beamform computer; wherein the beamformer applies the beamforming coefficients to a signal to produce a beamformed signal.

13. The system of claim 12 wherein the transmitting unit further comprises a transmitter, coupled to the beamformer; wherein the transmitter transmits the beamformed signal to the receiving unit through the communications channel.

14. The system of claim 9 wherein the receiving unit further comprises a postcodes that multiplies a received beamformed signal by a channel diagonalizing matrix.

15. The system of claim 9, wherein the channel transfer function matrix compressor compresses the channel transfer function matrix by applying operations selected from the group consisting of QR decomposition, Cholesky decomposition, Givens rotations and Householder rotations, wherein Q is a unitary matrix and R is an upper or lower triangular matrix.

16. The system of claim 9, wherein the channel transfer function matrix compressor scales the compressed channel transfer function matrix to produce a scaled compressed channel transfer function matrix having a preselected coefficient set to a preselected value.

17. The system of claim 11, wherein the beamform computer is configured to compute the set of beamforming coefficients by performing a singular value decomposition of the compressed channel transfer function matrix.

18. The system of claim 11, wherein the beamform computer is configured to remove a calibration matrix from the channel transfer function matrix before computing the beamforming coefficients.

19. A system comprising:
a receiver that receives a signal transmitted through a communications channel;
a channel state information CSI computer, coupled to the receiver, wherein the CSI computer processes the received signal to determine a transfer function matrix for the communications channel; and a transfer function matrix compressor, coupled to the CSI computer, wherein the transfer function matrix compressor compresses the transfer function matrix by applying a rotation matrix to the transfer function matrix to produce a compressed transfer function matrix (R) having a reduced number of non-zero coefficients and a set of statistical characteristics which are the same as a channel transfer function matrix (H) such that H*H=R*R and scales the compressed transfer function matrix (R) to produce a preselected value at a known location of the compressed transfer function matrix (R), wherein the compressed channel matrix values are
  directly useable as a channel transfer function matrix to compute a beam steering matrix at a transmitter providing the received signal.

20. The system of claim 19 further comprising a postcoder that multiplies a received beamformed signal by a channel diagonalizing matrix.

21. The system of claim 19, wherein the transfer function matrix compressor produces a compressed transfer function matrix by applying operations selected from the group consisting of QR decomposition, Cholesky decomposition, Givens rotations, and Householder rotations, wherein Q is a unitary matrix and R is an upper or lower triangular matrix.

22. The system of claim 19, wherein the transfer function matrix compressor scales the compressed transfer function matrix to produce a scaled compressed transfer function matrix to produce a scaled compressed transfer function matrix having a preselected coefficient set to a preselected value.

23. The system of claim 19, wherein the transfer function matrix compressor is configured to permute rows and columns of the compressed transfer function matrix in a predetermined order.

* * * * *